(12) United States Patent
Lee

(10) Patent No.: US 10,790,499 B2
(45) Date of Patent: Sep. 29, 2020

(54) METHOD FOR MANUFACTURING ELECTRODE FOR SECONDARY BATTERY SUITABLE FOR LONG LIFE

(71) Applicant: LG Chem, Ltd., Seoul (KR)

(72) Inventor: Young Hwan Lee, Gyeonggi-do (KR)

(73) Assignee: LG Chem, Ltd. (KR)

( * ) Notice: Subject to any disclaimer, the term of this patent is extended or adjusted under 35 U.S.C. 154(b) by 80 days.

(21) Appl. No.: 16/321,963

(22) PCT Filed: Jan. 11, 2018

(86) PCT No.: PCT/KR2018/000515
§ 371 (c)(1),
(2) Date: Jan. 30, 2019

(87) PCT Pub. No.: WO2018/147558
PCT Pub. Date: Aug. 16, 2018

(65) Prior Publication Data
US 2019/0165367 A1 May 30, 2019

(30) Foreign Application Priority Data

Feb. 7, 2017 (KR) .......................... 10-2017-0016579

(51) Int. Cl.
*H01M 4/136* (2010.01)
*H01M 4/36* (2006.01)
(Continued)

(52) U.S. Cl.
CPC ......... *H01M 4/136* (2013.01); *H01M 4/0404* (2013.01); *H01M 4/0471* (2013.01);
(Continued)

(58) Field of Classification Search
CPC .......................... H01M 4/0404; H01M 4/0471
See application file for complete search history.

(56) References Cited

U.S. PATENT DOCUMENTS

2008/0292965 A1 11/2008 Kubota et al.
2013/0224594 A1 8/2013 Yushin et al.
(Continued)

FOREIGN PATENT DOCUMENTS

JP 2012028215 A 2/2012
JP 5805568 B2 11/2015
(Continued)

OTHER PUBLICATIONS

Masafumi Arakawa, "Introduction to particle size measurement", Journal of the Society of Powder Technology, Jun. 1980, pp. 299-307, vol. 17, No. 6, Japan.
(Continued)

*Primary Examiner* — Matthew J Merkling
(74) *Attorney, Agent, or Firm* — Lerner, David, Littenberg, Krumholz & Mentlik, LLP

(57) ABSTRACT

The present disclosure provides a method for manufacturing an electrode having hollow carbon nanoparticles by mixing an electrode active material, a conductive material, a binder to produce a conventional electrode slurry, mixing with selenium-carbon particles, coating an electrode slurry, vaporizing selenium nanoparticles when drying in order to decrease the amount of conductive material in an electrode having long sustainability. The method for manufacturing an electrode for a secondary battery may be include; dispersing or dissolving a binder in a solvent to prepare a binder solution; preparing an electrode slurry by mixing the binder solution with an electrode material including an electrode (Continued)

active material, a conductive material, and selenium-carbon particles; coating the electrode slurry on a current collector to form a coating layer; and drying the coating the coating layer to vaporize amorphous selenium nanoparticles among the selenium-carbon particles and thereby forming hollow carbon nanoparticles in the coating layer.

4 Claims, 1 Drawing Sheet

(51) Int. Cl.
  *H01M 4/485* (2010.01)
  *H01M 4/587* (2010.01)
  *H01M 4/62* (2006.01)
  *H01M 4/1391* (2010.01)
  *H01M 4/131* (2010.01)
  *H01M 4/04* (2006.01)
  *H01M 4/139* (2010.01)
  *H01M 4/02* (2006.01)
  *B82Y 30/00* (2011.01)
  *B82Y 40/00* (2011.01)
  *H01M 10/0525* (2010.01)
  *H01M 2/10* (2006.01)
  *H01M 4/13* (2010.01)

(52) U.S. Cl.
  CPC ........... *H01M 4/131* (2013.01); *H01M 4/139* (2013.01); *H01M 4/1391* (2013.01); *H01M 4/366* (2013.01); *H01M 4/485* (2013.01); *H01M 4/587* (2013.01); *H01M 4/621* (2013.01); *H01M 4/625* (2013.01); *B82Y 30/00* (2013.01); *B82Y 40/00* (2013.01); *H01M 2/1016* (2013.01); *H01M 4/13* (2013.01); *H01M 10/0525* (2013.01); *H01M 2004/021* (2013.01); *H01M 2004/029* (2013.01); *Y02E 60/122* (2013.01); *Y02T 10/7011* (2013.01)

(56) References Cited

U.S. PATENT DOCUMENTS

| 2015/0030930 | A1 | 1/2015 | Archer et al. | |
| 2017/0084908 | A1* | 3/2017 | Guo | H01M 4/38 |
| 2017/0301914 | A1* | 10/2017 | Eissler | H01M 4/1393 |
| 2018/0287207 | A1* | 10/2018 | Dai | H01G 11/62 |

FOREIGN PATENT DOCUMENTS

| KR | 20080103011 A | 11/2008 |
| KR | 20090082973 A | 8/2009 |
| KR | 101115392 B1 | 2/2012 |
| KR | 20130037245 A | 4/2013 |
| KR | 101293965 B1 | 8/2013 |
| KR | 101296373 B1 | 8/2013 |
| KR | 20140039592 A | 4/2014 |
| KR | 20140044527 A | 4/2014 |
| KR | 20150014800 A | 2/2015 |
| KR | 20160037084 A | 4/2016 |
| KR | 20160118586 A | 10/2016 |

OTHER PUBLICATIONS

Search report from International Application No. PCT/KR2018/000515, dated May 8, 2018.

Daer et al., "Preparation of Monodisperse Carbonaceous Particles With Micro-, Meso-, and Macroporous Structures", Journal of Applied Polymer Science, John Wiley & Sons, INC, US, vol. 45, Issue 12, Aug. 25, 1992 (Aug. 25, 1992), pp. 2061-2073, XP000292418.

Extended European Search Report including the Search Opinion for Application No. EP 18751270.2 dated Aug. 2, 2019, pp. 1-6.

Zhang et al., "Encapsulation of selenium sulfide in double-layered hollow carbon spheres as advanced electrode material for lithium storage", Nano Research, Tsinghua University Press, CN, vol. 9, Issue 12, Jul. 2016, pp. 3725-3734, XP036101603.

* cited by examiner

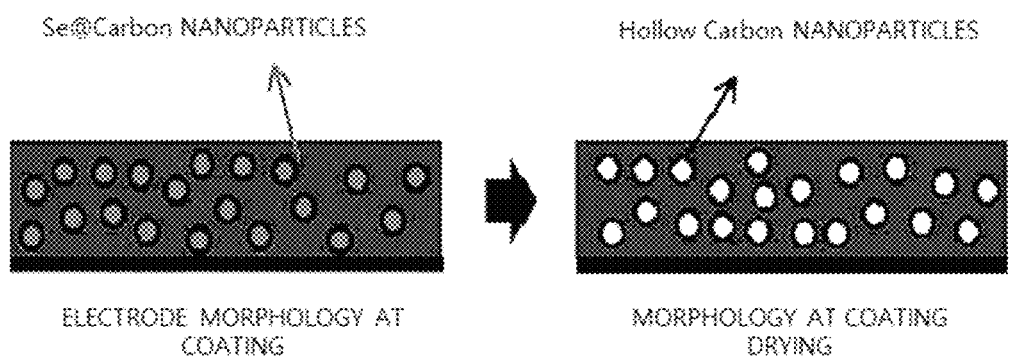

METHOD FOR MANUFACTURING ELECTRODE FOR SECONDARY BATTERY SUITABLE FOR LONG LIFE

CROSS-REFERENCE TO RELATED APPLICATIONS

The present application is a national phase entry under 35 U.S.C. § 371 of International Application No. PCT/KR2018/000515 filed Jan. 11, 2018, which claims priority from Korean Application No. 10-2017-0016579 filed Feb. 7, 2017, all of which are incorporated herein by reference.

TECHNICAL FIELD

The present disclosure relates to a method for preparing an electrode for a secondary battery by including selenium-carbon particles in an electrode slurry for a secondary battery, which is composed of an electrode active material, a conductive material and a binder, and more particularly to a method for preparing an electrode for a secondary battery, including: synthesizing selenium-carbon particles having a core of selenium and a shell of carbon using amorphous selenium nanoparticles; dispersing or dissolving a binder in a solvent to prepare a binder solution; preparing an electrode slurry by mixing the binder solution with an electrode material including an electrode active material, a conductive material, and the selenium-carbon particles; coating a current collector with the electrode slurry to form a coating layer; and drying the coating layer to vaporize the amorphous selenium nanoparticles and thereby forming hollow carbon nanoparticles in the coating layer.

BACKGROUND ART

As the technical development of and the demand for mobile devices have increased, the demand for secondary batteries as an energy source has rapidly increased. Among the secondary batteries, lithium secondary batteries, which have high energy density and discharge voltage, have been carried out much research and commercially available and widely used.

Typically, in terms of the shape of a battery, there is a high demand for a prismatic type secondary battery and a pouch type secondary battery that can be applied to products having a thin profile, such as mobile phones. In terms of materials for the battery, the demand for lithium secondary batteries such as lithium ion batteries and lithium ion polymer batteries, exhibiting high energy density, discharge voltage, and output stability is high.

The secondary battery according to its shape can be classified into a cylinder type battery cell, a prismatic type battery cell, and a pouch type battery cell. Among them, the cylinder type secondary battery comprises an electrode assembly, a cylinder type can including the electrode assemble, and a can assembly combined to the top of the can.

In the secondary battery, an electrode assembly installed in the battery case is an electricity generating element, which is composed of stacked structure of a positive electrode, a separator, and a negative electrode and can be charge and discharge. The electrode assembly can be approximately classified into a jelly-roll type, in which sheet type positive electrodes and negative electrodes applied an electrode active material slurry are wound while separators are disposed between the positive electrodes and the negative electrodes, a stacked type sequentially laminated in the state of a separator interposed between a plurality of positive electrode and negative electrode, and a stacked/folded type wound with unit cells of stacked type to long separated film. Among them, the jelly-roll type electrode assembly has advantages such as it is easy to manufacture and has high energy destiny per unit weight, thereby it is widely used.

The jelly-roll type electrode assembly composed of jelly-roll type wound with a positive electrode, a negative electrode, and a separator interposed between the two electrodes as cylinder type, and a positive electrode tab and a negative electrode tab each drawn from a positive electrode and a negative electrode. Generally, a positive electrode tab drawn to the upper part, and a negative electrode drawn to the lower part.

A can is a container of metal material having nearly cylinder form in cylinder type secondary batteries, and formed by manufacturing method such as deep drawing. Therefore, the can itself can be a terminal.

The cap assembly has a structure in which an upper end cap forming a positive electrode terminal, a PTC element configured to greatly increase a resistance of a battery to cut off a current when temperature inside the battery rises, a safety vent configured to cut off the current or exhaust gas when a pressure inside the battery rises, a gasket configured to electrically isolate the safety vent from a cap plate except for certain portions, and the cap plate to which a positive electrode terminal connected to the positive electrode is connected are sequentially stacked.

The positive electrode of the electrode assembly is electrically connected to one component of the cap assembly through the positive electrode tab which is drawn upward from the positive electrode, and the negative electrode is connected to a bottom surface of the can through the negative electrode tab which is drawn downward from the negative electrode. Of course, the electrode may be designed by changing polarity.

Further, an upper insulation member for insulating between the electrode assembly and the cap assembly is located therebetween, and a lower insulation member for insulating between the electrode assembly and the bottom surface of the can is located therebetween.

Meanwhile, a lithium secondary battery as an electrode active material comprises a positive electrode including lithium transition metal oxide, a negative electrode including a carbon-based active material, and a porous separator. The positive electrode is prepared by coating a positive electrode slurry to an aluminum foil, and the negative electrode is prepared by coating a negative electrode slurry including a carbon-based active material to a copper foil.

The positive electrode slurry and the negative electrode slurry added a conductive material to improve electrical conductivity of an active material. Especially, a lithium transition metal oxide used as a positive active material fundamentally has low electrical conductivity, thereby the positive electrode slurry requisitely added a conductive material.

As the conductive material, carbon-based materials such as graphite such as natural graphite and artificial graphite, carbon black such as carbon black, acetylene black, channel black, furnace black, lamp black, summer black, and the like are mainly used, and in some cases, conductive fibers such as carbon fibers, metal fibers, and the like are used. Specific examples of commercially available conductive materials may include various acetylene black products (available from Chevron Chemical Company), Denka Black (available from Denka Singapore Private Limited), various products available from Gulf Oil Company, Vulcan XC-72 (available from Cabot Company), Super P (Timcal Co., Ltd.), and the like.

As a demand for electricity increases, a lifespan of the battery gradually becomes longer and electrodes that can withstand long-term cycles are also emerging. In the case of long-life batteries, lack of an electrolyte which is a medium through which lithium ions migrate is considered to be one of causes of degradation of the long-life batteries, and causes a cycle life to be degraded.

Further, the electrolyte is not completely transferred into pores only by an initial electrolyte injection, and thus long-cycle performance may be degraded due to a local reaction in the electrode. In order to increase energy density of the battery, it is necessary to reduce an amount of the conductive material in the electrode to connect the electrode active material and the current collector with a minimum amount. However, it is not easy to maintain the same battery performance simply by reducing the amount of the conductive material, and thus there is a demand for an electrode configuration that can achieve the same performance while reducing the amount of the conductive material.

DISCLOSURE

Technical Problem

The present disclosure is provided to solve the above technical problems of the related art.

The present disclosure provides a method for preparing an electrode by mixing an electrode active material, a conductive material, a binder to produce a conventional electrode slurry, mixing with selenium-carbon particles, coating an electrode slurry, vaporizing selenium nanoparticles when drying, and forming hollow carbon nanoparticles on a coating layer.

Technical Solution

According to one exemplary embodiment of the present disclosure, there is provided a method for preparing an electrode for a secondary battery including: dispersing or dissolving a binder in a solvent to prepare a binder solution; preparing an electrode slurry by mixing the binder solution with an electrode material including an electrode active material, a conductive material, and selenium-carbon particles; coating the electrode slurry on a current collector to form a coating layer; and drying the coating layer to vaporize amorphous selenium nanoparticles among the selenium-carbon particles and thereby forming hollow carbon nanoparticles in the coating layer.

According to another exemplary embodiment of the present disclosure, the selenium-carbon particles may have a structure in which a core is selenium and a shell is carbon, and may be synthesized by self-assembly of amorphous selenium nanoparticles and carbon nanoparticles.

According to still another exemplary embodiment of the present disclosure, the amorphous selenium nanoparticles may be vaporized at 90 to 110° C.

According to still yet another exemplary embodiment of the present disclosure, a size of the hollow carbon nanoparticles may be in a range of 30 to 300 nm.

According to still yet another exemplary embodiment of the present disclosure, there may be provided an electrode for a secondary battery prepared by the above described method.

According to still yet another exemplary embodiment of the present disclosure, there may be provided a secondary battery including the electrode.

According to still yet another exemplary embodiment of the present disclosure, the battery may be any one selected from lithium ion batteries, lithium polymer batteries, and lithium ion polymer batteries.

According to still yet another exemplary embodiment of the present disclosure, there may be provided a battery pack including at least one above described secondary battery.

According to still yet another exemplary embodiment of the present disclosure, there may be provided a device including the battery pack as a power source.

According to still yet another exemplary embodiment of the present disclosure, the device may be any one selected from mobile phones, portable computers, smartphones, smart pads, netbooks, wearable electronic devices, light electronic vehicles (LEVs), electric vehicles, hybrid electric vehicles, plug-in hybrid electric vehicles, and power storage devices.

Effects of the Invention

The present disclosure provides a method for preparing an electrode for a secondary battery including: dispersing or dissolving a binder in a solvent to prepare a binder solution; preparing an electrode slurry by mixing the binder solution with an electrode material including an electrode active material, a conductive material, and selenium-carbon particles; coating the electrode slurry on a current collector to form a coating layer; and drying the coating layer to vaporize amorphous selenium nanoparticles among the selenium-carbon particles and thereby forming hollow carbon nanoparticles in the coating layer.

Further, the present disclosure according to the method provides an electrode capable of long sustainability, a secondary battery comprising the electrode, a battery pack using the secondary battery, and a device using the battery pack.

BRIEF DESCRIPTION OF THE DRAWING

FIGURE is a schematic view showing a forming process of an electrode structure according to an exemplary embodiment of the present disclosure.

DETAILED DESCRIPTION OF THE PREFERRED EMBODIMENTS

Hereinafter, preferred embodiments of the present disclosure will be described in detail. Further, the present embodiments are not intended to limit the scope of the present disclosure, but are merely presented as an example, and various modifications are possible to the extent that technological gist is not deviated.

A method for preparing an electrode for a secondary battery according to the present disclosure includes: dispersing or dissolving a binder in a solvent to prepare a binder solution; preparing an electrode slurry by mixing the binder solution with an electrode material including an electrode active material, a conductive material, and selenium-carbon particles; coating a current collector with the electrode slurry to form a coating layer; and drying the coating layer to vaporize amorphous selenium nanoparticles among the selenium-carbon particles and thereby forming hollow carbon nanoparticles in the coating layer.

Types of the binder, the electrode active material, and the conductive material will be described below together with a secondary battery according to the present disclosure.

The selenium-carbon particles of the present disclosure are synthesized in the form of a core of selenium and a shell of carbon. A core-shell structure is generally produced by a self-assembly method, and for self-assembly, the selenium-carbon particles need to be designed in the form of carbon. In the present disclosure, commercially available self-assembled carbon may be used, and a type thereof is also not limited.

The binder, the electrode active material, the conductive material, and the selenium-carbon particles are mixed together to prepare the electrode slurry, and the current collector is coated with the electrode slurry. A thickness of the coating will be described in detail below with the secondary battery according to the present disclosure.

When the coated electrode slurry is dried at 90 to 110° C., the amorphous selenium nanoparticles vaporize to form the hollow carbon nanoparticles. The formation of the hollow carbon nanoparticles means that spaces, in which the amorphous selenium nanoparticles have vaporized and escaped, remain as they are. Typical selenium has a high melting point and thus does not vaporize at a temperature of 90 to 110° C. However, the amorphous selenium nanoparticles may vaporize at a temperature of 90 to 110° C. because of being composed of much more disordered particles than crystalline nanoparticles and having a weakened intermolecular attraction.

Thus, a temperature lower than 90° C. is not preferable due to the problem in which the amorphous selenium nanoparticles are difficult to vaporize, and a temperature exceeding 110° C. is not preferable either since other compositions in the electrode slurry may also vaporize and thus an electrode structure may be changed.

Sizes of the hollow carbon nanoparticles are in a range of 30 to 300 nm. Hollow carbon having a size of less than 30 nm may not reduce an amount of the conductive material, and hollow carbon having a size of more than 300 nm may increase porosity, resulting in a decrease in energy density, which is not preferable.

The electrode for a secondary battery of the present disclosure prepared by the above-described method may prevent the electrolyte from being deficient since the hollow carbon nanoparticles function as a reservoir for the electrolyte, is also advantageous in electrolyte impregnation, and is suitable for a long-life electrode. Further, the electrode according to the present disclosure also has an advantage of high energy density while reducing the amount of conductive material.

Meanwhile, the present disclosure provides a secondary battery including the electrode which is prepared by the above-described method and suitable for a long-life.

The secondary battery according to the present disclosure is configured to accommodate an electrode assembly in which two electrodes of different polarities are laminated in a state of being separated by a separator, and the electrode assembly includes a positive electrode including a positive electrode active material, a negative electrode including a negative electrode active material, and a separator.

Specifically, the positive electrode is prepared, for example, by applying a mixture of a positive electrode active material, a conductive material, and a binder on a positive electrode current collector and then drying the resultant, and a filler may be further added to the mixture as necessary.

According to the present disclosure, the positive electrode active material may use layered compound such as lithium cobalt oxide ($LiCoO_2$), lithium nickel oxide($LiNiO_2$), etc. or compound substituted with one or more transition metals; formula $Li_{1+x}Mn_{2-x}O_4$ (wherein, x is 0 to 0.33), lithium manganese oxide ($LiMnO_2$) such as $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$, etc.; nickel site type lithium nickel oxide expressed as formula $LiNi_{1-x}O_2$ (wherein, M=Co, Mn, Al, Cu, Fe, Mg, B or Ga, x=0.01 to 0.3); lithium manganese composite oxide expressed as formula $LiMn_{2-x}M_xO_2$ (wherein, M=Co, Ni, Fe, Cr, Zn or Ta, x=0.01 to 0.1) or $Li_2Mn_3MO_8$ (wherein, M=Fe, Co, Ni, Cu or Zn), $LiMn_2O_4$ which part of lithium of the formula is substituted with alkaline earth metal ion; disulfide compound; compound having lithium intercalation material as main component such as composite oxides formed by $LiMn_2O_4$ or their combination.

The positive electrode collector may be generally prepared by 3 to 500 μm thickness. There is no particular limit as to the positive electrode current collector, so long as it does not cause chemical changes in the fabricated battery and has conductivity. For example, stainless steel, aluminum, nickel, titanium, sintered carbon or an aluminum or stainless steel surface treated with carbon, nickel, titanium or silver may be used. The current collector may form fine irregularities on its surface and may increase adhesion of a positive electrode active material, and it may be in a variety of form such as a film, a sheet, a foil, a net, a porous material, a foam, a non-woven fabric.

The conductive material may be generally added in an amount of 1 to 50 wt % based on the total weight of a mixture including a positive electrode active material. There is no particular limit as to the conductive material, so long as it does not cause chemical changes in the fabricated battery and has conductivity. For example, graphite such as natural or artificial graphite; carbon black such as carbon black, acetylene black, ketjen black, channel black, furnace black, lamp black, and thermal black; conductive fibers such as carbon fiber and metallic fiber; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and etc. may be used.

The binder is a component which supports combination of an active material and a conductive material and combination of a collector, conventionally the binder is added 1 to 50 weight % based on the total mixture weight including a positive electrode active material. Examples of the binder may be polyvinylidene fluoride, polyvinyl alcohol, carboxymethyl cellulose(CMC), starch, hydroxypropyl cellulose, regenerated cellulose, polyvinyl pyrrolidone, tetrafluoroethylene, polyethylene, polypropylene, ethylene-propylene-diether polymer(EPDM), sulfonation EPDM, styrene butyrene rubber, fluorine rubber, and various copolymers, etc.

The filler may be optionally used as a component to inhibit positive electrode expansion. The filler is not particularly limited so long as it is a fibrous material that does not cause chemical changes in the fabricated battery. Examples of the filler may include olefin-based polymers such as polyethylene and polypropylene; and fibrous materials such as glass fiber and carbon fiber, etc.

In addition, a negative electrode may be prepared by coating and drying a negative electrode material on a negative electrode current collector, and components described above may be further included.

The negative electrode current collector may be generally manufactured to 3 to 500 μm thickness. For the negative electrode current collector, a material not inducing the chemical change and having a high conductivity may be used without limitation. Examples of the negative electrode current collector may include copper, stainless steel, aluminum, nickel, titanium, sintered carbon, or an aluminum or stainless steel surface treated with carbon, nickel, titanium or silver. The negative electrode current collector same as the positive electrode current collector may have fine irregularities on the surface thereof to increase adhesion of the negative electrode active material, and may have various forms such as a film, a sheet, a foil, a net, a porous body, a foam, and a non-woven fabric, etc.

The negative electrode material may comprise amorphous carbon or crystalloid carbon, specifically non-graphitizing carbon or graphite-based carbon; metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; an oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer such as polyacetylene; or a Li—Co—Ni based material may be used.

For a separator insulating the electrodes between the positive electrode and the negative electrode, a conventional polyolefine-based separator or a composite separator formed an organic and inorganic composite layer on the olefin-based material may be used, and not limited thereto.

The electrolyte may be a non-aqueous electrolyte solution containing a lithium salt, and may include a non-aqueous electrolyte solution and lithium. Examples of the non-aqueous electrolyte solution may include non-aqueous electrolyte, solid electrolyte, inorganic solid electrolyte, etc.

The non-aqueous electrolytes, for example, may be aprotic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The organic solid electrolytes, for example, may be polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte solution may be nitrides, halides, and sulphates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte solution, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature storage characteristics, the non-aqueous electrolytic solution may further include carbon dioxide gas, and may further include fluoro-ethylene carbonate(FEC), propene sultone (PRS), etc.

The battery is any one selected among a lithium ion battery, a lithium polymer battery, a lithium ion polymer battery. This is classified according to property of electrolyte, and the positive electrode, the negative electrode, and electrolyte solution are described as above.

In addition, the present disclosure may provide a battery pack comprising one or more of the secondary battery.

The present disclosure also may provide a device including the battery pack. The device may include mobile phones, portable computers, smart phones, smart pads, wearable electronic devices, tablet PCs, netbooks, LEV (Light Electronic Vehicle), electric vehicles, hybrid electric vehicles and power storage devices.

Hereinafter, the present disclosure will be described in detail with reference to the following examples. However, the examples provided herein are for illustrating the present disclosure, and the scope of the present disclosure is not limited thereto.

EXAMPLE 1

Selenium-carbon particles were prepared by self-assembly of amorphous selenium nanoparticles and carbon nanoparticles. Mixed oxyhydroxide MOOH(M=Ni4/15(Mn1/2Ni1/2)8/15Co0.2) was used as a transition metal precursor to prepare a lithium-nickel-manganese-cobalt-based active material, and the mixed oxyhydroxide was mixed with Li2Co3 at a stoichiometric ratio (Li:M 1.02:1), and then the mixture was sintered in air at 900° C. for 10 hours to prepare a lithium mixed transition metal oxide. A positive electrode mixture was prepared by mixing 95.1 wt % of a positive electrode active material obtained by mixing the lithium mixed transition metal compound and Li2CoO2 in a ratio of 20:80 and 0.9 wt % of a porous conductive material having an average particle diameter of 35 nm and a DBP adsorption value of 360 ml/100 g with 2 wt % of polyvinylidene fluoride (PVdF) as a binder, and 2 wt % of 80 nm selenium-carbon particles and N-methylpyrrolidone (NMP) were added to the prepared positive electrode mixture to prepare a positive electrode mixture slurry. The positive electrode mixture slurry was applied on an aluminum foil as a current collector, followed by drying in a vacuum oven at 100° C. for 2 hours or more to prepare a positive electrode.

EXAMPLE 2

A positive electrode was prepared in the same manner as in Example 1 except that 150 nm selenium-carbon particles were used.

EXAMPLE 3

A positive electrode was prepared in the same manner as in Example 1 except that 250 nm selenium-carbon particles were used.

EXAMPLE 4

A positive electrode was prepared in the same manner as in Example 1 except that 150 nm selenium-carbon particles were used and dried at 90° C.

EXAMPLE 5

A positive electrode was prepared in the same manner as in Example 1 except that 150 nm selenium-carbon particles were used and dried at 110° C.

COMPARATIVE EXAMPLE 1

A positive electrode was prepared in the same manner as in Example 1 except that selenium-carbon particles were not used.

Electrolyte impregnation rate of the positive electrode each prepared in the Example 1 to 5 and Comparative Example 1 is measured, and the result is shown in Table 1.

TABLE 1

|  | Electrolyte Impregnation Rate (mm3/sec) |
| --- | --- |
| Example 1 | 1.4 |
| Example 2 | 1.5 |
| Example 3 | 1.6 |
| Example 4 | 1.4 |
| Example 5 | 1.5 |
| Comparative Example 1 | 0.7 |

As shown in Table 1, it can be seen that the positive electrodes of Examples 1 to 5 prepared using the positive electrode slurry prepared by mixing the selenium-carbon particles according to the present disclosure have an electrolyte impregnation rate two times higher than that of the positive electrode of Comparative Example 1 prepared using the conventional method.

As described above, while the present disclosure has been described with reference to specific embodiments and drawings, the present disclosure is not limited thereto. It is clear by those skilled in the art that various modifications and alterations may be made without departing from the spirit and scope of the present disclosure and equivalents of the appended claims.

The invention claimed is:

1. A method for manufacturing an electrode for a secondary battery, comprising:
    dispersing or dissolving a binder in a solvent to prepare a binder solution;
    preparing an electrode slurry by mixing the binder solution with an electrode material including an electrode active material, a conductive material, and selenium-carbon particles;
    coating the electrode slurry on a current collector to form a coating layer;
    drying the coating layer to vaporize amorphous selenium nanoparticles among the selenium-carbon particles and thereby forming hollow carbon nanoparticles in the coating layer.

2. The method of claim 1, wherein the selenium-carbon particles have a structure in which a core is selenium and a shell is carbon.

3. The method of claim 1, wherein the amorphous selenium nanoparticles is vaporized at a temperature of from 90 to 110° C.

4. The method of claim 1, wherein a size of the hollow carbon nanoparticles is in a range of from 30 to 300 nm.

* * * * *